United States Patent
Yamada (10) Patent No.: US 8,191,814 B2
(45) Date of Patent: Jun. 5, 2012

(54) PRETENSIONER AND PRETENSIONER MANUFACTURING METHOD

(75) Inventor: Taku Yamada, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 226 days.

(21) Appl. No.: 12/551,266

(22) Filed: Aug. 31, 2009

(65) Prior Publication Data

US 2010/0051733 A1   Mar. 4, 2010

(30) Foreign Application Priority Data

Sep. 4, 2008 (JP) ................... 2008-226937

(51) Int. Cl.
*B65H 75/48* (2006.01)

(52) U.S. Cl. ...................................... 242/374

(58) Field of Classification Search .............. 242/374
See application file for complete search history.

(56) References Cited

U.S. PATENT DOCUMENTS

| | | | | |
|---|---|---|---|---|
| 5,489,072 A * | 2/1996 | Gordon et al. | ........... | 242/374 |
| 6,299,090 B1 * | 10/2001 | Specht et al. | ........... | 242/374 |
| 6,446,897 B1 * | 9/2002 | Arima et al. | ........... | 242/374 |
| 6,450,435 B2 * | 9/2002 | Junker et al. | ........... | 242/374 |
| 7,793,982 B2 * | 9/2010 | Krauss | ........... | 280/806 |
| 2009/0134691 A1 * | 5/2009 | Choi et al. | ........... | 297/480 |

FOREIGN PATENT DOCUMENTS

JP   2000-313313 A   11/2000

* cited by examiner

*Primary Examiner* — Sang Kim
(74) *Attorney, Agent, or Firm* — Roberts Mlotkowski Safran & Cole, P.C.

(57) ABSTRACT

A pretensioner is provided, of which the cylinder, including a restriction portion, can be inexpensively formed, the cylinder having the restriction portion for positioning a gas generation unit to be mounted to a cylinder, and a pretensioner manufacturing method for manufacturing such a pretensioner is provided. In the pretensioner, since the cylinder is molded by forging, an inexpensive material compared with a stainless pipe member can be used for the molding. In addition, since the positioning portion can be molded during forging-molding for molding the entire cylinder, cost can be reduced even in this regard.

2 Claims, 6 Drawing Sheets

PRETENSIONER AND PRETENSIONER MANUFACTURING METHOD

CROSS-REFERENCE TO RELATED APPLICATION

This application claims priority under 35 USC 119 from Japanese Patent Application No. 2008-226937 filed on Sep. 4, 2008, the disclosure of which is incorporated by reference herein.

BACKGROUND OF THE INVENTION

1. Field of the Invention

The present invention relates to a pretensioner that increases tension of a webbing belt configuring a seatbelt device of a vehicle in a vehicle rapid-deceleration state or the like, and relates to a pretensioner manufacturing method for manufacturing such a pretensioner.

2. Related Art

In a seatbelt device disclosed in Japanese Patent Application Laid-Open (JP-A) No. 2000-313313, a pressurized gas generator is mounted in a tube shape cylinder (called "pipe" in JP-A No. 2000-313313) configuring a pretensioner at one end of the cylinder. When the pressurized gas generation device is activated and thus internal pressure of the cylinder is increased, plural rolling elements, which are accommodated in a line in the cylinder, are sequentially pushed out from the other end of the pipe by such increased internal pressure. The rolling elements are pushed out, and then press a linear or beltlike tension medium.

Thus, a pulley of a clutch wound with the tension medium is rotated in a winding direction, and then the clutch is connected to a retractor shaft (a spool), so that the retractor shaft rotates in the winding direction. The retractor shaft rotates in the winding direction in this way, thereby a webbing (a webbing belt) is wound on the retractor shaft, so that tension of the webbing is increased, consequently a passenger body may be strongly restrained by the webbing.

In the pretensioner having the configuration as disclosed in JP-A No. 2000-313313, a pipe member such as stainless steel pipe is typically used for a cylinder (called "pipe" in JP-A No. 2000-313313 as described above) that is mounted with a gas generation unit called pressurized gas generation device or gas generator, and furthermore accommodates the rolling elements and a piston, which are moved by pressure of gas generated by the gas generation unit.

Since the cylinder is mounted with the gas generation unit as described above, the cylinder is deformed for positioning the gas generation unit in the cylinder.

However, the pipe member used for such a cylinder is a relatively expensive material. In addition, the pipe member is deformed for the positioning, causing further increase in cost.

SUMMARY OF THE INVENTION

In consideration of the fact, the present invention provides a pretensioner, of which the cylinder may be inexpensively formed, including forming of a restriction portion for positioning a gas generation unit to be mounted in the cylinder, and provides a pretensioner manufacturing method for manufacturing such a pretensioner.

A pretensioner according to a first aspect of the invention includes: a gas generation unit that is activated to generate gas; a cylinder that is formed into a cylindrical shape open at both ends by forging-molding, has the gas generation unit mounted thereto from one of the open ends, and is supplied with gas generated by the gas generation unit to the inside of the cylinder so that internal pressure of the cylinder is increased; a tension adding (increasing) unit that is moved within the cylinder by gas pressure provided by the gas generation unit so as to increase tension of a webbing belt configuring a seatbelt device; and a restriction portion that is formed on an inner circumferential portion of the cylinder by the forging-molding, and that interferes, inside the cylinder, with the gas generation unit mounted to the cylinder so as to restrict relative displacement of the gas generation unit with respect to the cylinder.

In the pretensioner according to the first aspect of the invention, when the gas generation unit, which is mounted (fitted) to the cylinder from one of the open ends of the cylinder, is activated, gas is generated by the gas generation unit, and the gas is supplied into the cylinder. When the gas is supplied into the cylinder and thus internal pressure of the cylinder is increased in this way, the tension adding unit works to increase tension of the webbing belt configuring the seatbelt device. Thus, a passenger's body wearing the webbing belt is further strongly restrained by the webbing belt.

On the other hand, the gas generation unit, which is mounted (fitted) to the cylinder from one of the open ends of the cylinder, is interfered with the restriction portion formed on the inner circumferential portion of the cylinder. Thus, relative displacement of the gas generation unit with respect to the cylinder is restricted, so that the gas generation unit is positioned with respect to the cylinder.

In the pretensioner according to the first aspect of the invention, the cylinder is molded by forging, and the restriction portion is formed at the time of this molding of the cylinder by the forging, leading to a relatively small number of processing steps. In addition, since the cylinder, including the restriction portion, is molded by forging, material cost of the cylinder may be reduced.

Furthermore, since the entire cylinder is molded by forging, increase in strength of the entire cylinder can be obtained due to work hardening caused at the time of the forging-molding, compared with a case where a cylinder is formed by performing bending of an appropriate portion of a pipe member. Thus, in the aspect of the present invention, the cylinder can be reduced in wall thickness, leading to further reduction in material cost, and reduction in weight of the cylinder.

A pretensioner includes various configurations such as a configuration where a spool of a webbing winding device for winding a webbing belt is forcibly rotated by pressure of the gas so that the webbing belt is wound on the spool, so increasing tension of the webbing belt, and a configuration where a buckle which is to be mounted with a tongue provided on the webbing belt, or an anchor latched with a tip end portion of the webbing belt is moved in a predetermined direction by the above mentioned pressure of the gas, so increasing tension of the webbing belt. However, the present invention is not limited to specific configurations regarding a setting position of the pretensioner and the like, and may be applied to any types of pretensioner as long as a cylinder is formed into a cylindrical shape opened at both ends, and a gas generation unit is mounted to the cylinder at one end of the cylinder.

In the pretensioner according to a second aspect of the invention in the first aspect of the invention, the restriction portion restricts relative rotation of the gas generation unit with respect to the cylinder about an axis whose direction is a penetration (an axial) direction of the cylinder.

In the pretensioner according to a third aspect of the invention in the second aspect of the invention, a through hole is formed at the restriction portion, an inner circumferential shape of the through hole being substantially the same as an outer circumferential shape of a gas blowing section provided at an end portion of the gas generation unit, the gas generated at the gas generation unit being supplied to the inside of the cylinder through the gas blowing section, and the gas blowing section is fitted in the through hole.

In the pretensioner according to a fourth aspect of the invention in the second aspect of the invention, the inner circumferential shape of the through hole and the outer circumferential shape of the gas blowing section are a noncircular shape.

In the pretensioner according to the second, third, fourth aspects of the invention, the restriction portion restricts relative rotation of the gas generation unit with respect to the cylinder about the axis whose direction is the penetration direction of the cylinder (that is, a direction from one end to the other end of the cylinder). Therefore, for example, when a connection unit, which is for connecting the gas generation unit to a control unit or the like that controls the gas generation unit, is connected to the gas generation unit mounted in the cylinder, a orientation of the connection unit and the like can be stabilized, and consequently operability of connecting operation of such a connection unit can be improved.

A pretensioner manufacturing method according to a fifth aspect of the present invention is a method for manufacturing a pretensioner that increases tension of a webbing belt configuring a seatbelt device by increased internal pressure of a cylinder upon activation of a gas generation unit, the cylinder being formed into a cylindrical shape open at both ends, the gas generation unit being mounted to the cylinder from one of the open ends of the cylinder, the method comprising a cylinder manufacturing process that forms the cylinder, the process including: forming, by forging-molding of a metal-block molding material, a cylindrical body configuring the cylinder which is open at both ends; and forming a restriction portion on an inner circumferential portion of the cylindrical body by forging-molding, the restriction portion interfering, inside the cylinder, with the gas generation unit mounted to the cylinder so as to restrict relative displacement of the gas generation unit with respect to the cylinder.

Further, in the pretensioner manufacturing method according to a sixth aspect of the present invention in the fifth aspect of the invention, the restriction portion is a node portion that divides the inside of the cylinder into one end side and another end side of the cylinder, and a non-circular through hole, whose inner circumferential shape is smaller than that of the cylindrical body, is formed in the node, whereby the restriction portion restricts relative rotation of the gas generation unit with respect to the cylinder about an axis whose direction is a penetrating direction of the cylinder due to a portion of the gas generation unit being fitted in the through hole.

In the pretensioner manufacturing method according to the fifth and sixth aspects of the invention, a cylinder, which has a cylindrical shape (tube shape) opened at both ends, and is mounted with the gas generation unit from one of the open ends of the cylinder, is formed by performing of forging a metal-block molding material (performing forging-molding of the molding material).

In addition, while the cylinder has a cylindrical shape having both ends communicating with each other, a node (in other words, a middle portion for dividing (separating) between the both ends) is formed inside between both ends of a metal-block molding material during molding. A through hole, which has a small outline compared with an inner circumferential shape of the cylinder, and has a noncircular shape, is formed in the node in the forging step, thereby the both ends of the cylinder communicate with each other, and the restriction portion, which extends from the inner circumferential portion of the cylinder in a direction perpendicular to a penetrating (hole-through) direction of the cylinder.

When the gas generation unit is mounted to the cylinder from one end of the cylinder, the gas generation unit is restricted in displacement with respect to the cylinder by the restriction portion, so that the gas generation unit is positioned with respect to the cylinder.

In the method of manufacturing the pretensioner according to the aspects of the invention, the cylinder is molded by forging, and the restriction portion is formed during this molding the cylinder by forging, leading to a relatively small number of processing steps. In addition, since the cylinder, including the restriction portion, is molded by forging, material cost of the cylinder can be reduced.

Furthermore, since the entire cylinder is molded by forging, increase in strength of the entire cylinder can be obtained due to work hardening caused at the time of the forging-molding, compared with a case where a cylinder is formed by performing bending of an appropriate portion of a pipe member. Thus, in the aspects the present invention, the cylinder can be reduced in wall thickness, leading to further reduction in material cost, and reduction in weight of the cylinder.

A pretensioner includes various configurations such as a configuration where a spool of a webbing winding device for winding a webbing belt is forcibly rotated by pressure of the gas so that the webbing belt is wound on the spool, so increasing tension of the webbing belt, and a configuration where a buckle which is to be mounted with a tongue provided on the webbing belt, or an anchor latched with a tip end portion of the webbing belt is moved in a predetermined direction by the above mentioned pressure of the gas, so increasing tension of the webbing belt. However, the present invention is not limited to specific configurations regarding a setting position of the pretensioner and the like, and may be applied to any manufacturing methods of a cylinder, and any manufacturing methods a pretensioner as long as a cylinder is formed into a cylindrical shape opened at both ends, and a gas generation unit is mounted to the cylinder at one end of the cylinder.

As described hereinbefore, according to the pretensioner and the method of manufacturing a pretensioner according to the invention, a cylinder can be formed at low cost including forming of a restriction portion that positions a gas generation unit.

BRIEF DESCRIPTION OF THE DRAWINGS

An exemplary embodiment of the invention will be described in detail with reference to the following figures, wherein.

DESCRIPTION OF THE PREFERRED EMBODIMENT

Configuration of the Exemplary Embodiment

Figure 3:
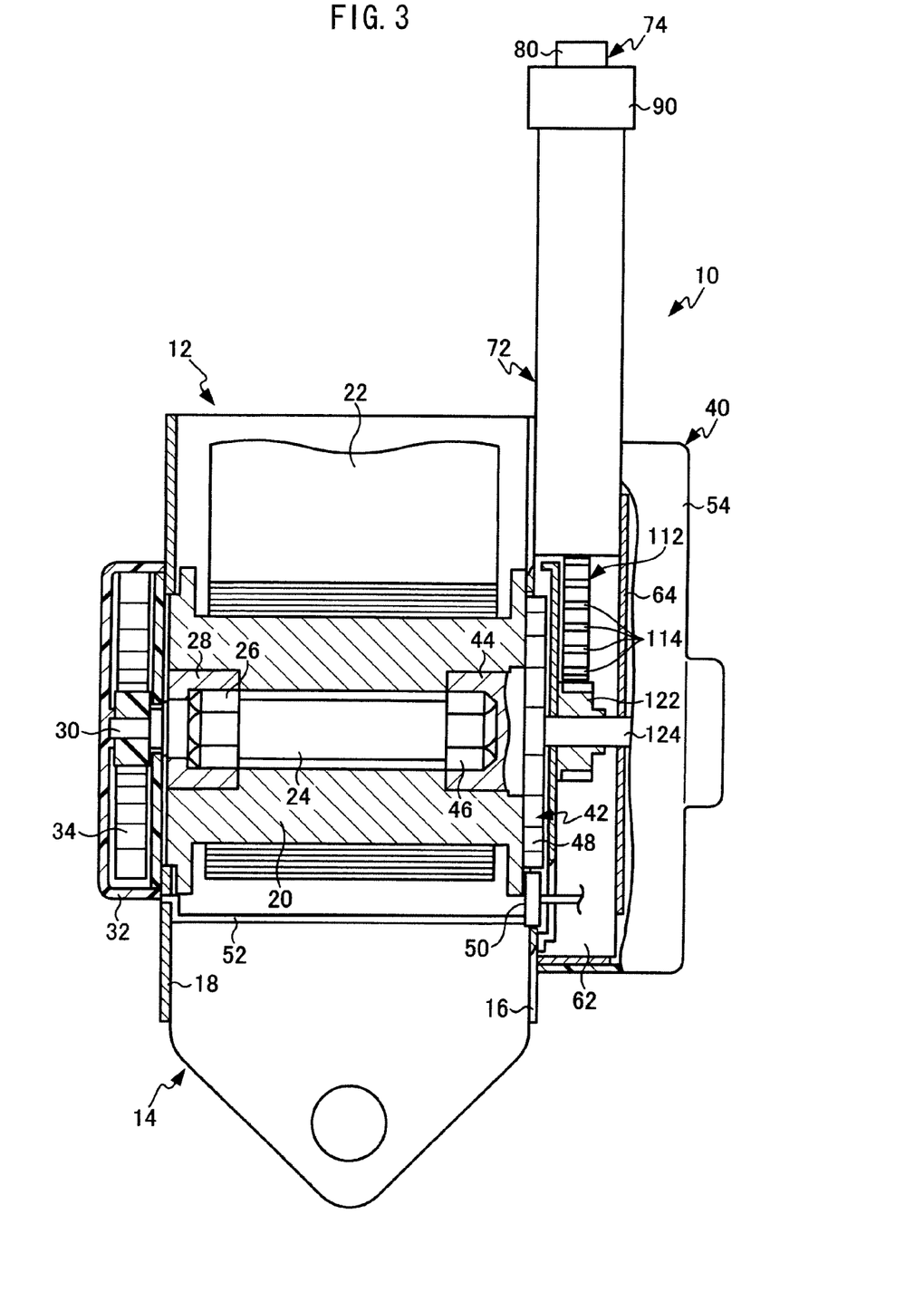
FIG. 3 is a schematic, front section view of the webbing winding device using the pretensioner according to the embodiment of the invention.

FIG. 3 shows an outline of a configuration of a webbing winding device 12 of a seatbelt device using a pretensioner 10 according to an embodiment of the invention.

As shown in the figure, the webbing winding device 12 has a frame 14 fixed to a skeletal member of a vehicle or a reinforcement member for reinforcing such a skeletal member by a fastener such as bolt. The frame 14, for example, has a pair of leg plates 16 and 18 opposed to each other in a back and forth direction of the vehicle. A spool 20 is provided between the leg plates 16 and 18. The spool 20 is formed into a cylindrical shape having an axial direction being along a facing direction of the leg plates 16 and 18, and is latched with a base end of a long and narrow webbing belt 22 at the middle in the axial direction. The spool 20 is rotated in a winding direction as one direction about an axis thereof, and thus winds the webbing belt 22 in layers from a base end of the belt.

The spool 20 made to be hollow along a central axis thereof, and a torsion shaft 24 as an energy absorbing unit is accommodated coaxially to the spool 20. The torsion shaft 24 is formed into a rod-like shape along the central axis of the spool 20 in a longitudinal direction (an axial direction) of the shaft, and a spool-side connection 26 is formed at an end on a leg plate 18 side of the shaft. An outer circumferential shape of the connection 26 is formed into a noncircular shape such as polygon or star shape as viewed along the axial direction of the shaft 24.

An adapter 28 is inserted, in correspondence to the connection 26, to the spool 20 from an open end on a leg plate 18 side of the spool coaxially to the spool 20. The adapter 28 is formed into a bottomed cylindrical shape that is opened toward a side of the leg plate 16 along the axial direction of the spool 20, and an inner circumferential shape of the adapter is formed into a noncircular shape so as to allow insertion of the connection 26 thereto. Therefore, while the connection 26 is inserted to the adaptor 28, relative rotation of the torsion shaft 24 about the central axis of the shaft 24 is not allowed with respect to the adaptor 28.

Moreover, an outer circumferential shape of the adaptor 28 is formed into a noncircular shape such as polygon or star shape, and a shape of an opening (inner circumferential shape) on the leg plate 18 side of the spool 20, the opening being inserted with the adapter 28, is formed into a noncircular shape in correspondence to the outer circumferential shape of the adaptor 28. Therefore, relative rotation of the adapter 28 about the central axis of the spool 20 is not allowed with respect to the spool 20, and consequently relative rotation of the torsion shaft 24 is not allowed with respect to the spool 20. In FIG. 3, from the adaptor 28, a shaft 30 is extended to a side opposite to a leg plate 16 side in a coaxial manner to the spool 20. The shaft 30 penetrates the leg plate 18, and enters a spring case 32 attached to the leg plate 18 on the outside of the leg plate 18 (on a side opposite to a leg plate 16 side of the leg plate 18), and is rotatably supported by the spring case 32.

A spiral spring 34 as a spool urging tool is accommodated within the spring case 32. The spiral spring 34 is latched by the spring case 32 at an outer end in a spiral direction of the spring, and latched by the shaft 30 at an inner end in the spiral direction. When the shaft 30 is rotated in a drawing direction, the spiral spring 34 is wound and fastened, causing urging force of the spring 34. The urging force urges the shaft 30 in a winding direction. Since relative rotation of the adapter 28 is not allowed with respect to the spool 20 as above, when the webbing belt 22 is drawn out from the spool 20, and thus the spool 20 is rotated in the drawing direction, the urging force produced in the spring 34 urges the spool 20 in the winding direction, enabling winding of the webbing belt 22 on the spool 20.

A lock base 42 configuring a lock mechanism 40 is provided on a side of the leg plate 16 along the axial direction of the spool 20. A fitting portion 44 is formed on the lock base 42, and the fitting portion 44 is inserted to the spool 20 from an open end on the leg plate 16 side of the spool 20. An outer circumferential shape of the fitting portion 44 is formed into a circular shape as viewed along the axial direction of the spool 20, and since the fitting portion 44 is coaxially inserted to the spool from the open end on the leg plate 16 side, relative rotation of the fitting portion 44 (that is, lock base 42) is allowed about the central axis of the spool 20. The fitting portion 44 is formed into a cylindrical shape that is opened in a direction along the central axis of the spool 20. An inner circumferential shape of the fitting portion 44 is formed into a noncircular shape such as polygon or star shape up to an open end on a side of the leg plate 18 with respect to the middle of the fitting portion 44 along the axial direction of the spool 20.

A lock-base-side connection 46 is formed at an end of the torsion shaft 24 on a side opposite to a side of the spool-side connection 26. An outer circumferential shape of the connection 46 is formed into a noncircular shape so as to be insertable into the inside of the lock base 42. Therefore, while the connection 46 is inserted to the fitting portion 44, relative rotation of the torsion shaft 24 is not allowed with respect to the fitting portion 44 (that is, lock base 42) about the central axis of the shaft 24.

On the other hand, a ratchet 48 is provided on the lock base 42 on the outside of the spool 20 with respect to the open end on the leg plate 16 side of the spool 20. In the embodiment, the ratchet 48 is formed as an external-gear ratchet wheel, and formed coaxially and integrally to the fitting portion 44. A lock pawl 50 is provided on a lateral side of the ratchet 48 along a rotational radius direction of the lock base 42.

A leg plate 18 side portion of the lock pawl 50 along the axial direction of the spool 20 is supported by the leg plate 18 in a manner of being rotatable by a shaft 52 with respect to the leg plates 16 and 18 and other members about an axis having the same axial direction as the axial direction of the spool 20. The lock pawl 50 turns so that a tip thereof approaches or leaves the periphery of the ratchet 48 (lock pawl 50), and when the lock pawl 50 turns in a direction of approaching the periphery of the ratchet 48 (lock pawl 50), the tip of the lock pawl 50 is engaged with ratchet teeth formed on the periphery of the ratchet 48. While the tip of the lock pawl 50 is engaged with the ratchet teeth formed on the periphery of the ratchet 48, rotation in a drawing direction of the ratchet 48 (lock pawl 50) is restricted.

A housing 54 of the lock mechanism 40 is attached to the leg plate 16 on an outer side of the leg plate 16 (a side opposite to a leg plate 18 side of the leg plate 16). The housing 54 accommodates various members therein, which moves the ratchet 48 to the outside in a rotation radius direction of the spool 20 (that is, various members configuring the lock mechanism 40) when the spool 20 is suddenly rotated in the drawing direction, or when a vehicle goes into a rapid deceleration state. The members interlock with one another, so that when the spool 20 is suddenly rotated in the drawing direction, or when a vehicle goes into a rapid deceleration state, rotation in the drawing direction of the lock base 42, and in turn rotation in the drawing direction of the spool 20 may be restricted.

Figure 1:
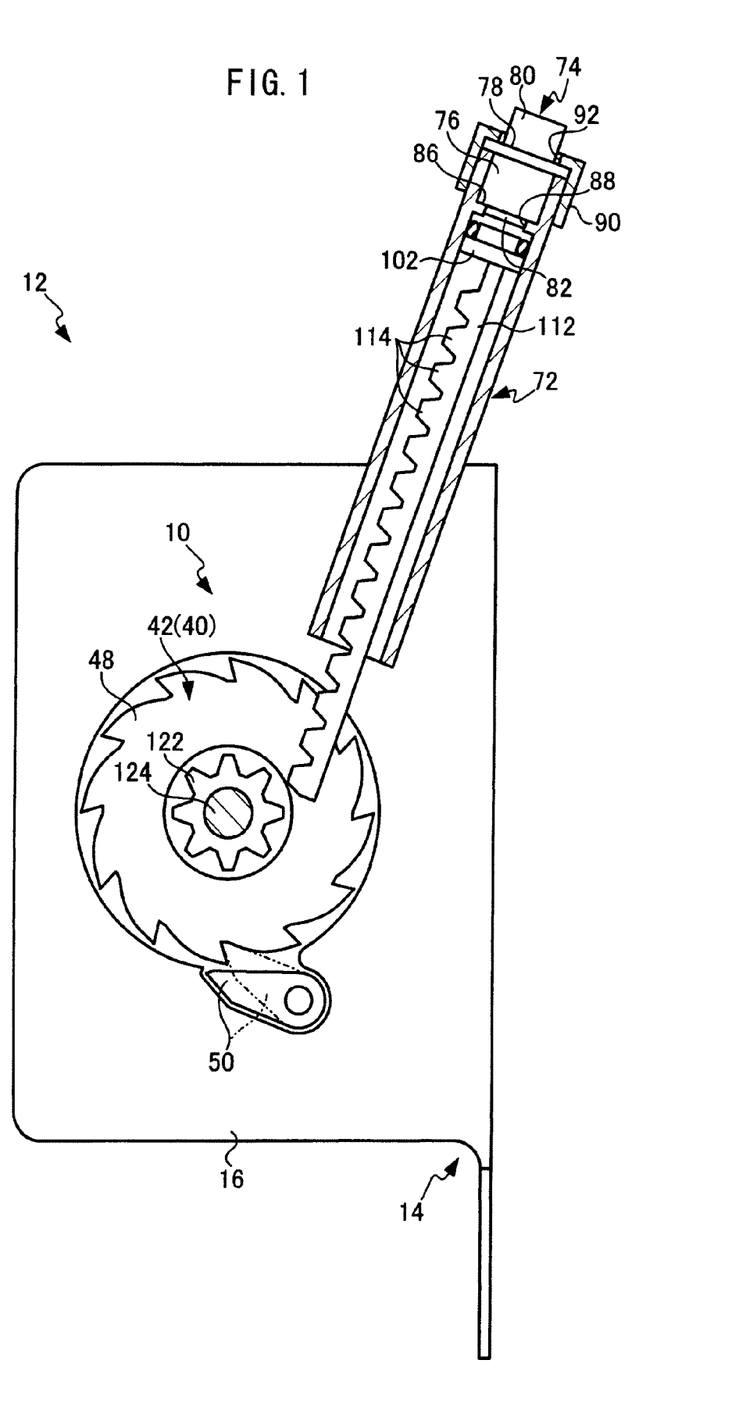
FIG. 1 is a schematic side view of a webbing winding device using a pretensioner according to an embodiment of the invention.

A cover plate 62 of the pretensioner 10 is provided on the inside of the housing 54. The cover plate 62 has a wall 64 having a thickness direction being along a thickness direction of the leg plate 16, and is fixed to the leg plate 16 by a screw, a bolt and the like in such a manner that a wall surface of the wall 64 is separated from the leg plate 16. A cylinder 72 configuring the pretensioner 10 is provided between the wall 64 of the cover plate 62 and the leg plate 16. As shown in FIG. 1, the cylinder 72 is formed into a cylindrical shape (tube shape) having an axial direction thereof being along a direction perpendicular to the axial direction of the spool 20.

A gas generator 74 as a gas generation unit is provided on one end side in an axial direction of the cylinder 72. The gas generator 74 has a circular generator body 76 having a circular, outer circumferential shape in correspondence to an inner circumferential shape of the cylinder 72. The generator body 76 is made to be hollow, within which a gas generating agent that may momentarily generate gas by burning the agent, an igniting agent for igniting the gas generating agent, and an ignition device for ignition of the igniting agent.

A flange 78 is formed at an end of the generator body 76 on a one end side in the axial direction of the cylinder 72. The flange 78 is formed into a disk shape of which the outer diameter dimension is equal to or more than an inner diameter dimension of the cylinder 72 and equal to or less than an outer diameter dimension thereof, and formed coaxially to the generator body 76. As shown in FIG. 1, the generator body 76 of the gas generator 74 is inserted to the cylinder 72 from the one end in the axial direction of the cylinder 72. When the generator body 76 is inserted to the cylinder 72 in this way, the flange 78 abuts the one end in the axial direction of the cylinder 72.

A connection section 80 is formed on the flange 78 on a side opposite to a side of the generator body 76. The connection section 80 has an outer circumferential shape of which the outer diameter dimension is sufficiently smaller than an outer diameter dimension of the generator body 76. A connector, which is electrically connected to the ignition device accommodated in the generator body 76, is provided in the connection section 80, and the connector is directly or indirectly connected with a control unit such as ECU via a cable having one end connected to the connector. The control unit is electrically connected to a vehicle rapid-deceleration detection unit such as an acceleration sensor for detecting acceleration of a vehicle. When an electric signal from the vehicle rapid-deceleration detection unit, which has detected a vehicle rapid-deceleration state, is inputted into the control unit, the control unit outputs a ignition signal. When the ignition device accommodated in the generator body 76 is inputted with the ignition signal from the control unit, the ignition device ignites the ignition agent. The ignited ignition agent ignites the gas generating agent, and thus the gas generating agent is burned, causing momentary gas generation.

Figure 4:
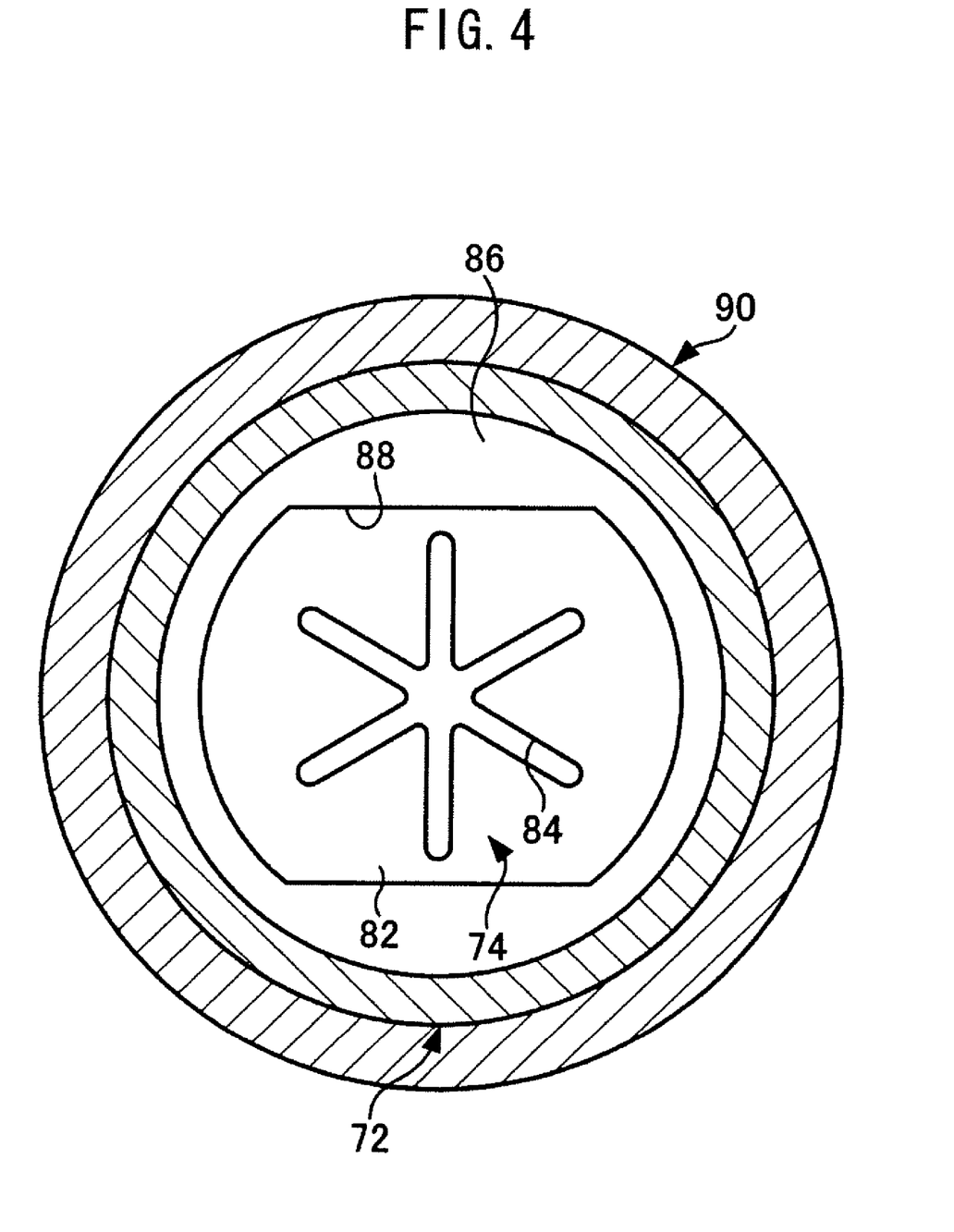
FIG. 4 is a section view of a cylinder.

A gas blowing section 82 is formed on the generator body 76 on a side opposite to a side of the flange 78 of the body 76. As shown in FIG. 4, the gas blowing section 82 has an outer circumferential shape formed into an oval shape (more particularly, a shape given by cutting two sides of a circle (a center of the circle is located between the two sides) in parallel). In the gas blowing section 82, a radial gas blow hole 84, which is opened toward a side opposite to a side of the body 76, and the inside of the gas blowing section 82 communicates with the outside of the section 82 (the inside of the cylinder 72 when the body 76 is inserted to the cylinder 72) via the gas blow hole 84. The inside of the gas blowing section 82 communicates with the inside of the body 76. Therefore, gas generated by combustion of the gas generating agent in the body 76 is exhausted to the outside of the gas generator 74 (the inside of the cylinder 72 when the body 76 is inserted to the cylinder 72) through the inside of the gas blowing section 82 and the gas blow hole 84.

A positioning portion 86 as a restriction portion and/or a high-strength portion is formed on an inner circumferential portion of the cylinder 72 in correspondence to the gas blowing section 82. The positioning portion 86 is formed into a plate shape having a thickness direction being approximately along an axial direction of the cylinder 72, and is extended from the inner circumferential portion of the cylinder 72 toward a center axis of the cylinder 72. The cylinder 72 basically has a cylindrical shape having a uniform thickness. However, the cylinder 72 has a thickness from an outer circumferential portion of the cylinder 72 to an end of the positioning portion 86 at an axis side of the cylinder 72 in a region where the positioning portion 86 is formed, so that the cylinder 72 is large in thickness in the region compared with any other region (where the positioning portion 86 is not formed) of the cylinder 72.

A fitting hole 88 is formed in the positioning portion 86. The fitting hole 88 is a through-hole so as to communicate one end side of the cylinder 72 to the other end side of the cylinder 72 with respect to the positioning portion 86, and has an inner circumferential shape being the same as an outer circumferential shape of the gas blowing section 82 formed in the gas generator 74 (strictly, a substantially similar figure being slightly larger than the outer circumferential shape of the gas blowing section 82). As shown in FIG. 1, when the generator body 76 is inserted to the cylinder 72 until the flange 78 abuts the one end of the cylinder 72 in a state in which the gas blowing section 82 and the fitting hole 88 are in the same phase about a central axis of the cylinder 72, the gas blowing section 82 is inserted to the fitting hole 88.

As described above, the gas blowing section 82 has a noncircular shape, and the inner circumferential shape of the fitting hole 88 is the same as the outer circumferential shape of the gas blowing section 82. Therefore, when the gas generator 74 is tried to be rotated about the central axis of the cylinder 72 while the gas blowing section 82 is entered (fitted) in the fitting hole 88, an inner circumferential portion of the fitting hole 88 interferes with an outer circumferential portion of the gas blowing section 82. Therefore, the gas generator 74 may not be rotated while the gas blowing section 82 is entered in the fitting hole 88.

A cap 90 is provided at the one end of the cylinder 72. The cap 90 is formed into a bottomed cylindrical shape opened toward a side of the other end in the axial direction of the cylinder 72. A female screw (omitted to be shown in the drawings) is formed on an inner circumferential portion of the cap 90, the female screw being able to be screwed with a male screw (omitted to be shown in the drawings) formed on an outer circumferential portion of the cylinder 72 near the one end of the cylinder 72. The female screw on the inner circumferential portion of the cap 90 is screwed with the male screw on the cylinder 72, thereby the cap 90 is mounted on the one end of the cylinder 72.

A circular hole 92 is formed in a bottom of the cap 90, the hole 92 having an inner diameter dimension being larger than an outer diameter dimension of the connection section 80, and smaller than an outer diameter dimension of the flange 78. When the cap 90 is mounted on the cylinder 72 while the gas generator 74 is mounted in the one end of the cylinder 72, the connection section 80 projects through the hole 92 to a side opposite to a cylinder side with respect to the bottom of the cap 90. In addition, the flange 78 is tightly sandwiched by the one end of the cylinder 72 and the bottom of the cap 90, so that the gas generator 74 is fixed to the cylinder 72.

A piston 102 is accommodated inside the cylinder 72 on a side of the other end of the cylinder 72 with respect to the positioning portion 86 in a slidable manner along the central axis of the cylinder 72. A rack bar 112 as a tension adding unit is formed at an end on a side opposite to a side of the fitting hole 88 of the piston 102. The rack bar 112 is formed into a narrow plate shape whose longitudinal direction is along a central axis direction of the cylinder 72, and whose thickness direction is along the axial direction of the spool 20, and integrally connected to the piston 102 at a base end in the longitudinal direction of the rack bar 112. Rack teeth 114 are formed at one end in a width direction of the rack bar 112.

A pinion gear 122 is provided on a lateral side of a tip end of the rack bar 112 in an initial state (that is, before the pretensioner 10 is activated). The pinion gear 122 is coaxially and integrally mounted on a shaft 124 extended from an end face on a side opposite to a side of the fitting portion 44 of the ratchet 48 coaxially to the ratchet 48 (that is, coaxially to the spool 20).

As shown in FIG. 1, the rack teeth 114 of the rack bar 112 are not engaged with the pinion gear 122 in an initial state of the pretensioner 10, and therefore even if the pinion gear 122 is rotated in either of the drawing direction and the winding direction, the pinion gear 122 is not engaged with the rack teeth 114 in the state. When the piston 102 slides to a side of the other end in the axial direction of the cylinder 72 (that is, a side opposite to a side where the gas generator 74 is provided), the rack teeth 114 of the rack bar 112 are engaged with the pinion gear 122, so that the pinion gear 122 is rotated in the winding direction.

In the configuration of the embodiment, the pinion gear 122 is mounted on the shaft 124 coaxially and integrally to the shaft. However, a configuration is also used, the configuration including such a clutch unit that the pinion gear 122 may be mounted on the shaft 124 coaxially and relatively rotatably to the shaft, and the pinion gear 122 is integrally connected to the shaft 124 only when the pinion gear 122 is rotated in a winding direction. When such a configuration is used, the rack teeth 114 may be engaged with the pinion gear 122 in an initial state of the pretensioner 10.

Description on Method of Manufacturing Cylinder 72

Next, summary of a method of manufacturing the cylinder 72 configuring the pretensioner 10 is described.

Figure 5A:
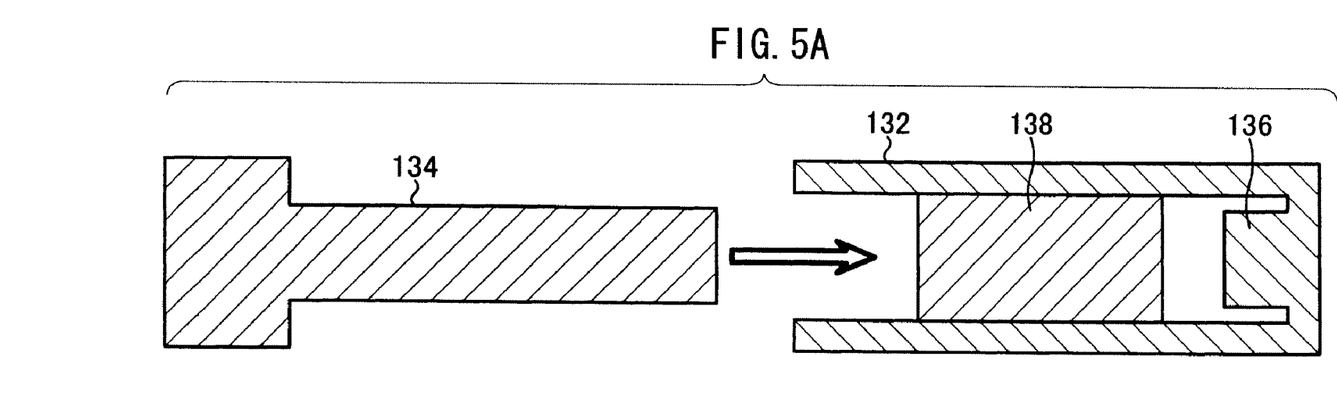
FIGS. 5A, 5B are views schematically showing a forging/molding step of the cylinder.
Figure 5B:
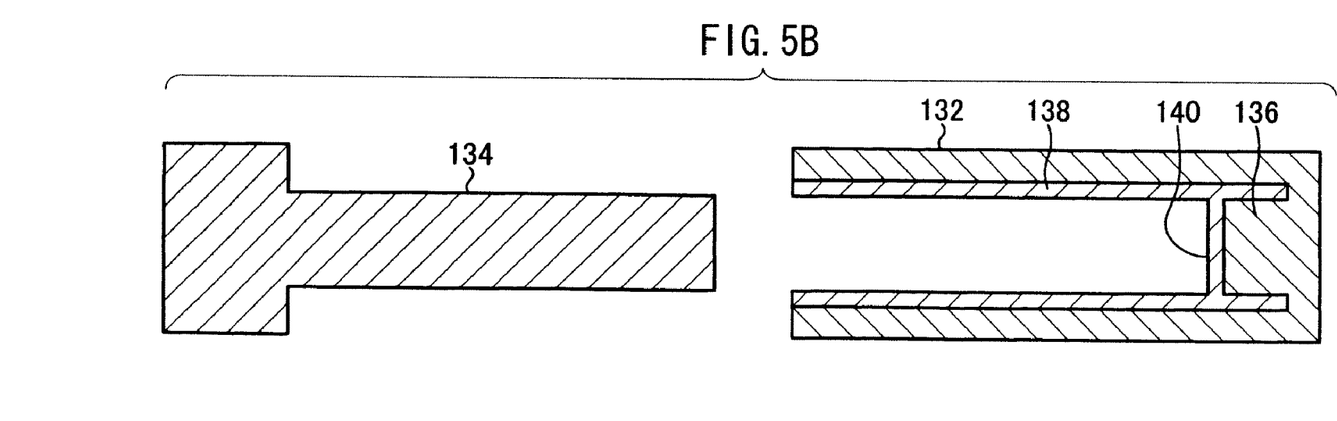

A manufacturing process of the cylinder 72 includes a forging step. The forging step includes a cylindrical body (tube body) formation step as shown in FIGS. 5A and 5B. In the cylindrical body formation step, a die 132 and a punch 134 as shown in FIG. 5A are used. The die 132 is formed such that it has a bottom portion and one end thereof being opened, and inner circumferential shape is a circular. A core 136 having a cylinder shape (circular rod shape) is protrusively provided from the center of the bottom portion of the die 132 toward an open end side of the die 132. On the other hand, the punch 134 is formed into a cylinder shape (circular rod shape) having an outer diameter dimension being approximately the same as an outer diameter dimension of the core 136. While a metal-block molding material 138 is accommodated in the die 132, the molding material 138 is molded by forging by the punch 134 disposed coaxially with respect to the die 132 and the core 136. As shown in FIG. 5B, the molding material 138 is formed into a cylindrical (tube) shape, in which a plate-like partition 140 (node) which will become the positioning portion 86 is formed in the middle in an axial direction of the material 138, by the forging-molding.

Figure 6A:
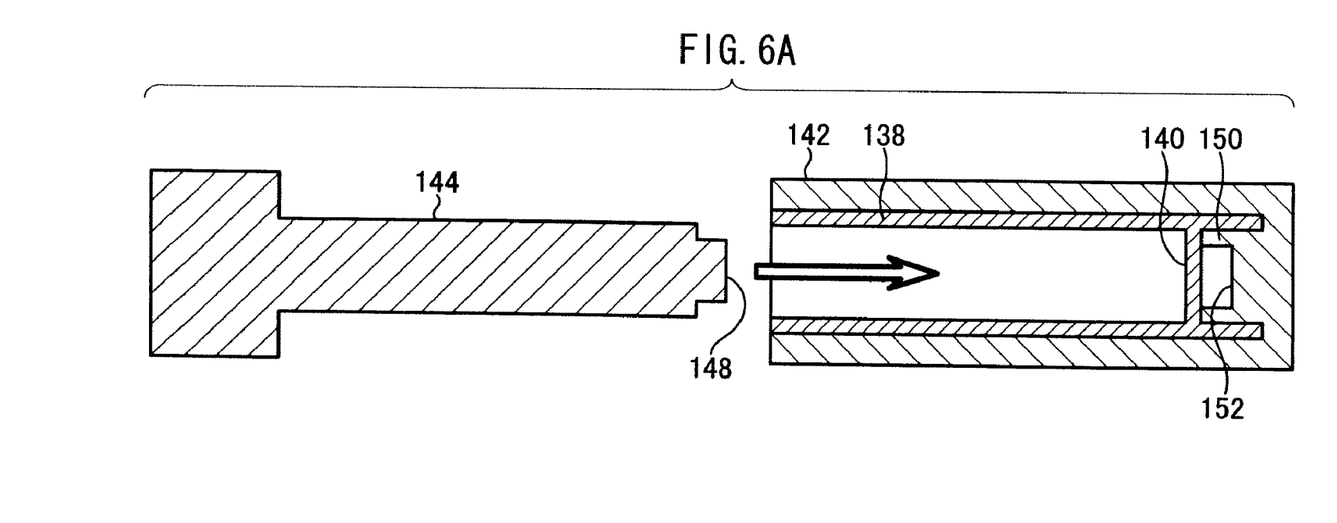
FIGS. 6A, 6B are views schematically showing a step of forming a restriction portion.
Figure 6B:
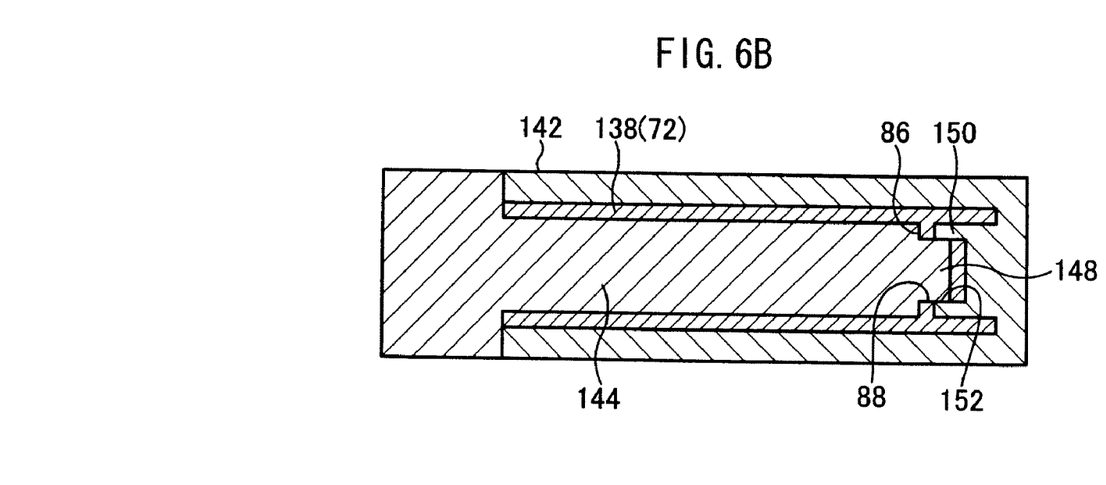

Next, in a trim step shown in FIGS. 6A and 6B, a die 142 and a trim punch 144 are used as shown in FIG. 6A. The trim punch 144 is formed into a cylinder shape (circular rod shape) having an outer diameter dimension being approximately same as an inner diameter dimension of the molding material 138 that has been molded into a cylindrical shape by the die 132 and the punch 134, and has a trimming portion 148 formed at a tip end of the trim punch 144. The trimming portion 148 has an outer circumferential shape being approximately the same as an inner circumferential shape of the above mentioned fitting hole 88, in which a projection dimension from the tip end of the trim punch 144 is equal to or larger than a thickness dimension of the partition 140.

The die 142 has an inner circumferential shape formed into a circular shape of which the inner diameter dimension is approximately equal to an outer diameter dimension of the molding material 138 that has been formed into a cylindrical shape by the die 132 and the punch 134. Furthermore, a core 150 is formed on a bottom of the die 142 coaxially to an inner circumferential portion of the die 142, an outer diameter dimension of the core 150 being approximately equal to an inner diameter dimension of an inner circumferential portion of the molding material 138 that has been formed into a cylindrical shape by the core 136. Furthermore, an accommodating portion 152 having a bottomed-hole shape, which is opened at a tip end of the core 150, is formed in the core 150. The accommodating portion 152 has an inner circumferential shape being approximately equal to an inner circumferential shape of the fitting hole 88, and has a depth equal to or more than the thickness of the partition 140.

In the trim step, the molding material 138 subjected to forging-molding in the cylindrical body formation step is accommodated into the die 142, and subjected to molding using the trim punch 144 in such a state. As shown in FIG. 6B, in such molding using the trim punch 144, a part of the partition 140 is trimmed by the trimming portion 148 formed on the tip end of the trim punch 144 so that a through hole is formed. Thus, the partition 140 is formed into the positioning portion 86 having the fitting hole 88.

A male screw is formed on the outer periphery of the molding material 138, which has been subjected to the forging-molding step including the above steps, near one end thereof. Thus, the cylinder 72 is formed.

Operation and Effects of the Embodiment

Next, operation and effects of the embodiment are described.

In the webbing winding device 12 using the pretensioner 10, while a passenger sitting on a vehicle seat wears the webbing belt 22 on its body, when the vehicle goes into a rapid deceleration state, or when the vehicle is rapidly decelerated, the passenger body, which tries to move to a vehicle front side due to inertia, suddenly pulls the webbing belt 22, thereby the spool 20 is suddenly rotated in the drawing direction. Then, components of the lock mechanism 40 accommodated in the housing 54 interlock to turn the lock pawl 50 in such a direction that a tip of the lock pawl 50 approaches an outer circumferential portion of the ratchet 48. When the tip of the lock pawl 50 is thus engaged with the teeth of the ratchet 48 as shown by an imaginary line (a two-dot chain line) in FIG. 1, rotation of the ratchet 48 (that is, lock base 42) is restricted in a drawing direction.

The fitting portion 44 of the lock base 42 is fitted in the spool 20 in such a manner that relative rotation thereof is allowed with respect to the spool 20, but is not allowed with respect to the lock-base-side connection 46 of the torsion shaft 24. In addition, the spool-side connection 26 of the torsion shaft 24 may not relatively rotate with respect to the adapter 28, and furthermore the adapter 28 may not relatively rotate with respect to the spool 20, therefore relative rotation of the lock base 42 is not basically allowed with respect to the spool 20. In this way, rotation in the drawing direction of the lock base 42 is restricted, and thereby rotation in the drawing direction of the spool 20 is restricted. Therefore, the webbing belt 22 may not be drawn from the spool 20. Thus, when the vehicle is rapidly decelerated, the passenger body, which tries to move to a vehicle front side due to inertia, may be held by the webbing belt 22.

Next, a vehicle rapid-deceleration detection unit such as an in-vehicle acceleration sensor detects rapid deceleration of the vehicle (for example, sudden stop of the vehicle) based on the above condition. At that time, when a detection signal outputted from the rapid-deceleration detection unit is inputted to a control unit such as ECU controlling the pretensioner 10, the control unit outputs ignition signal. The ignition signal outputted from the control unit is inputted to the ignition device accommodated in the generator body 76, and then the ignition device inputted with the ignition signal ignites the ignition agent. The ignited ignition agent ignites a gas-generating agent, and thus the gas-generating agent is burned, leading to abrupt gas generation.

The gas generated through combustion of the gas-generating agent is exhausted from the gas blow hole 84 formed in the gas blowing section 82 to the outside, that is, to the inside of the cylinder 72 through the inside of the generator body 76 and the inside of the gas blowing section 82. When the gas is exhausted to the inside of the cylinder 72 in this way, internal pressure of the cylinder 72 is momentarily increased, so that the piston 102 slides the cylinder 72 to the other end side of the cylinder 72, that is, to a side opposite to a side where the gas generator 74 is provided.

Figure 2:
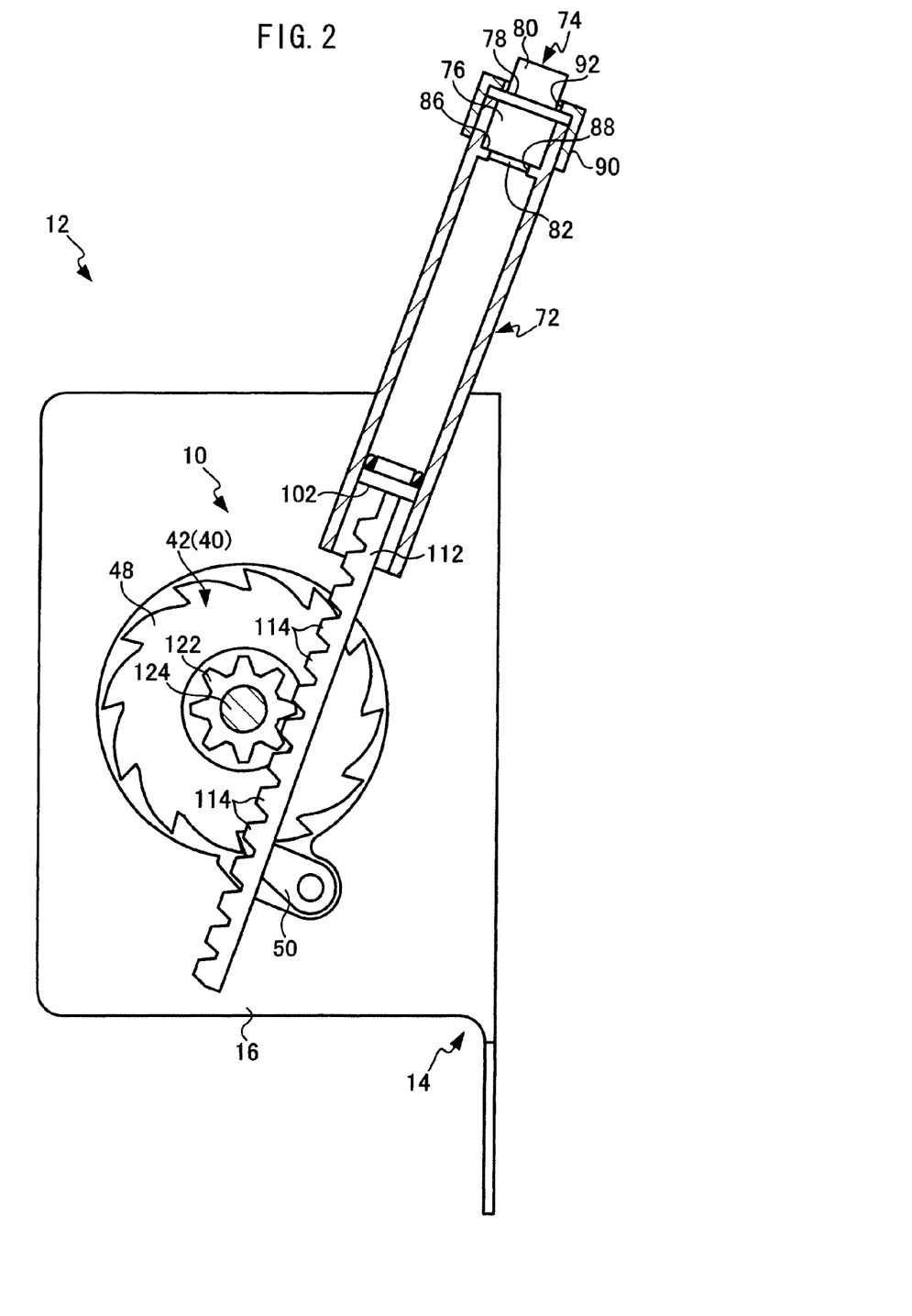
FIG. 2 is a side view corresponding to FIG. 1, showing the pretensioner being activated.

When the piston 102 slides in this way, the rack bar 112 integral with the piston 102 extends to the outside of the cylinder 72 from the other end of the cylinder 72. Thus, as shown in FIG. 2, the rack teeth 114 of the rack bar 112 are engaged with the pinion gear 122, and forcibly rotate the pinion gear 122 in the winding direction. The pinion gear 122 is connected to the spool 20 via the shaft 124, the lock base 42, the torsion shaft 24, and the adapter 28 in a manner of being not allowed to relatively rotate with respect to the spool 20. Therefore, the pinion gear 122 is forcibly rotated in the winding direction, causing forcible rotation of the spool 20 in the winding direction, so that the webbing belt 22 is wound on the spool 20 from a base end in a longitudinal direction of the belt.

Thus, a passenger body is further strongly held, and even if vehicle rapid-deceleration state further occurs, the passenger body may be prevented or effectively suppressed from inertially moving to the vehicle front side.

When the pretensioner 10 is activated, gas generated in the generator body 76 is exhausted from the gas blow hole 84 of the gas blowing section 82 as described above. In an initial state of the pretensioner 10, since the piston 102 is located near the one end of the cylinder 72 compared with in a state after the pretensioner has been activated, capacity of the cylinder 72 between the piston 102 and the gas blowing section 82 is minimized. In such a state, gas abruptly exhausted into a space between the piston 102 and the gas blowing section 82 presses the piston 102 toward the other end side of the cylinder 72, and the gas strongly presses the inner circumferential portion of the cylinder 72 radially outwardly in a direction perpendicular to a through (penetration) direction of the cylinder 72.

The pretensioner 10 of the embodiment has the positioning portion 86, which is formed on a part of a region, where the gas pressure immediately after the pretensioner 10 has been activated, in the inner circumferential portion of the cylinder 72. The cylinder 72 has a large wall thickness in the region where the positioning portion 86 is formed compared with other regions of the cylinder 72. Therefore, sufficient strength can be ensured against strong gas pressure immediately after the pretensioner 10 is activated.

In addition, when the piston 102 is slid by the gas pressure, capacity of the cylinder 72 increases between the piston 102 and the gas blowing section 82. Therefore, as the piston 102 is slidably moved, gas pressure is gradually decreased compared with gas pressure immediately after the pretensioner 10 is activated. This allows low mechanical strength of the cylinder on the other end side of the cylinder 72 with respect to a position of the piston 102 in the initial state of the pretensioner 10 compared with that in the region where gas pressure is applied immediately after the pretensioner 10 has been activated.

In the pretensioner 10, the cylinder 72 is molded by forging as mentioned above, and the cylinder 72 has a small thickness on the other end side of the cylinder 72 with respect to a region where the positioning portion 86 of the cylinder 72 is formed, compared with in the region of the positioning portion 86. Therefore, the thickness of the cylinder 72 on the other end side with respect to the region, in which the positioning portion 86 of the cylinder 72 is formed, is set to a thickness to the degree withstanding the gas pressure, which gas pressure is reduced compared with gas pressure immediately after the pretensioner 10 is activated as described above, thereby the cylinder 72 can be reduced in weight, consequently the pretensioner 10, and the webbing winding device 12 can be reduced in weight.

Furthermore, as described above, since the cylinder 72 is molded by forging, an inner diameter dimension of the cylinder 72 or thickness of the positioning portion 86 can be changed without changing an outer diameter dimension of the cylinder. Therefore, for example, even if gas generators 74 which are different in gas generating amount or gas pressure depending on a vehicle type are used, a sufficient strength to withstand the gas pressure can be ensured by the wall thickness of the cylinder 72 or thickness of the positioning portion 86 being changed without changing an outer diameter dimension of the cylinder 72.

In addition, since the cylinder 72 is molded by forging, increase in strength of the entire cylinder 72 can be expected due to work hardening caused by forging-molding. Therefore, reduction in thickness of the cylinder 72 can be achieved, leading to further reduction in material cost or reduction in weight of the cylinder 72.

Furthermore, the outer diameter dimension of the cylinder 72 may not be changed as above, which means that even if a specification of the gas generator 74 is changed, the cylinder 72 is mounted in the webbing winding device 12 in the same way, and a relative positional relationship of the cylinder 72 with respect to members (other than the cylinder 72) configuring the webbing winding device 12 is not changed. Therefore, a webbing winding device 12 having the same configuration can be used regardless of the specification of the gas generator 74, leading to cost reduction.

The cylinder 72 is molded by forging. Since the molding material 138 for forging is inexpensive compared with a stainless pipe member, material cost can be reduced. In addition, since the positioning portion 86 can be molded during forging-molding for molding the entire cylinder 72, cost can be reduced even in this regard.

Moreover, an inner diameter dimension of the cylinder 72 can be changed on the one end side of the cylinder with respect to the positioning portion 86 without changing an outer diameter dimension of the cylinder 72 and/or an inner diameter dimension of the cylinder 72 on the other end side of the cylinder with respect to the positioning portion 86. Therefore, even if an outer diameter dimension of the generator body 76 is changed due to difference in specification of the gas generator 74, an outer diameter dimension of the cylinder 72 may not be changed as described above, and consequently a webbing winding device 12 having the same configuration may be still used regardless of the specification of the gas generator 74, leading to cost reduction.

Furthermore, since the cylinder 72 is molded by forging, an inner diameter dimension of the cylinder 72 can be changed on the one end side of the cylinder with respect to the positioning portion 86 without changing an outer diameter dimension of the cylinder 72, and/or an inner diameter dimension of the cylinder 72 on the other end side of the cylinder with respect to the positioning portion 86. Therefore, even if an outer diameter dimension of the generator body 76 is changed due to difference in specification of the gas generator 74, an outer diameter dimension of the cylinder 72 may not be changed as described above, and consequently a webbing winding device 12 having the same configuration may be still used regardless of the specification of the gas generator 74, leading to cost reduction.

In addition, since the inner diameter dimension of the cylinder 72 on the other end side of the cylinder with respect to the positioning portion 86 can not be changed as described above, the piston 102 can be commonly used regardless of the specification of the gas generator 74, leading to further reduction in cost.

Moreover, as described above, even if the positioning portion 86 is formed in the cylinder 72, the outer diameter dimension of the cylinder 72 is not changed. In addition, since the positioning portion 86 is formed from the partition 140 which is formed from an excess material (material other than material forming the main body of the cylinder 72) during forging-molding of the cylinder 72. Therefore, a specification of the positioning portion 86, including a forming position of the positioning portion 86, an extension dimension of the positioning portion 86 from the inner circumferential portion of the cylinder 72, and furthermore thickness of the positioning portion 86 along a through direction of the cylinder 72, can be varied without changing an outer circumferential shape of the cylinder 72. Thus, since a specification of the frame 14 to be assembled with the cylinder 72, or a specification of the cover plate 62 can be commonly used for cylinders 72 being different in specification of the positioning portion 86, the pretensioner may be widely used, and cost can be reduced even in this regard.

What is claimed is:

1. A pretensioner, comprising:
a gas generation unit that is activated to generate gas;
a cylinder that is formed into a tubular cylindrical shape open at both ends by forging-molding, has the gas generation unit mounted thereto from one of the open ends, and is supplied with gas generated by the gas generation unit to the inside of the cylinder so that internal pressure of the cylinder is increased;
a tension adding unit that is moved within the cylinder by gas pressure provided by the gas generation unit so as to increase tension of a webbing belt configuring a seatbelt device; and
a restriction portion that is integrally formed on an inner circumferential wall of the cylinder by the forging-molding that increases the thickness and hoop strength of the wall of the cylinder, and that interferes, inside the cylinder, with the gas generation unit mounted to the cylinder so as to restrict relative displacement of the gas generation unit with respect to the cylinder,
wherein the restriction portion restricts relative rotation of the gas generation unit with respect to the cylinder about an axis whose direction is a penetration direction of the cylinder, and
a through hole is formed at the restriction portion, an inner circumferential shape of the through hole being substantially the same as an outer circumferential shape of a gas blowing section provided at an end portion of the gas generation unit, the gas generated at the gas generation unit being supplied to the inside of the cylinder through the gas blowing section, and the gas blowing section is fitted in the through hole, and
the inner circumferential shape of the through hole and the outer circumferential shape of the gas blowing section are a non-circular shape.

2. The pretensioner of claim 1, further comprising a cap disposed over the open end of the cylinder where the gas generator unit is mounted, said cap having a wall that circumscribes and reinforces the cylinder wall containing the gas generator unit.

* * * * *